United States Patent [19]

Jones

[11] 4,114,274

[45] Sep. 19, 1978

[54] MOVABLE POWER-OPERATED INSTRUMENT CONSOLE AND TREATMENT CHAIR APPARATUS

[75] Inventor: Arthur Lee Jones, Charlotte, N.C.

[73] Assignee: Pelton & Crane Company, Charlotte, N.C.

[21] Appl. No.: 741,381

[22] Filed: Nov. 12, 1976

[51] Int. Cl.² .............................................. A61C 19/02

[52] U.S. Cl. ........................................................ 32/22

[58] Field of Search ....................... 297/330, 347, 348; 32/22

[56] References Cited

U.S. PATENT DOCUMENTS

| | | | |
|---|---|---|---|
| 3,311,411 | 3/1967 | Page et al. | 32/22 |
| 3,894,601 | 7/1975 | Gestring | 297/348 |

*Primary Examiner*—Robert Peshock

*Attorney, Agent, or Firm*—Bell, Seltzer, Park & Gibson

[57] ABSTRACT

Movable power-operated instrument console and treatment chair apparatus, characterized by being selectively individually or simultaneously movable to desired positions for patient treatment, is provided, generally as follows. A treatment chair includes an occupant supporting assembly, a base assembly, and an elevator assembly including drive mechanisms for raising and lowering the occupant supporting assembly. An instrument console has a tray assembly for carrying instruments and the like, a base assembly, and an elevator assembly including drive mechanisms for raising and lowering the tray assembly. Control mechanisms are connected with both of the drive mechanisms for selectively (1) simultaneously raising or lowering or (2) independently raising or lowering of the treatment chair and the instrument console. An auxiliary instrument console may be provided which includes a tray assembly, a base assembly and an elevator assembly having drive mechanisms for raising and lowering of the tray assembly, and the control mechanisms also operate to simultaneously raise or lower the auxiliary instrument console with the primary instrument console and treatment chair or provide for independent raising and lowering of the auxiliary instrument console.

13 Claims, 7 Drawing Figures

MOVABLE POWER-OPERATED INSTRUMENT CONSOLE AND TREATMENT CHAIR APPARATUS

This invention relates to movable power-operated instrument console and treatment chair apparatus characterized by being selectively individually or simultaneously movable to desired positions for patient treatment.

BACKGROUND OF THE INVENTION

Various arrangements for dental, medical or other instrument consoles and treatment chair apparatus have heretofore been provided, such as the extremely commerically successful behind-the-patient dental console described and illustrated in U.S. Pat. No. 3,524,256, issued Aug. 18, 1970, and assigned to the assignee of the present invention, along with other arrangements of dental consoles beside and in front of the patient. With those dental consoles which are positioned beside or in front of the patient, often overhanging portions are mounted for movement to and from an over-the-patient position.

With the advent of electrically operated dental chairs which raise and lower automatically by operation of the dentist or dental assistant to position the patient at desired elevations and at desired reclining positions, as shown in U.S. Pat. No. 3,804,460, issued Apr. 16, 1974, and assigned to the assignee of the present invention, these previously proposed over-the-patient or beside-the-patient instrument consoles have caused problems with either interference in raising and lowering of the patient by the automatically operated dental chair or with being positioned at proper elevations for use by the dentist and dental assistant.

Examples of such previously proposed dental, medical or other treatment instrument consoles may be seen in the following prior patents considered with respect to the present invention:

| Patent No. | Inventor | Issue Date |
|---|---|---|
| 3,262,735 | E. O. Thompson | July 26, 1966 |
| 3,311,411 | R. W. Page et al | March 28, 1967 |
| 3,418,714 | H. Pietschmann | December 31, 1968 |
| 3,568,317 | M. L. Braun et al | March 9, 1971 |
| 3,662,465 | E. Heubeck | May 16, 1972 |
| 3,771,226 | N. H. Lieb et al | November 13, 1973 |
| 3,823,475 | E. Heubeck | July 16, 1974 |
| 3,902,246 | H. M. Wolf et al | September 2, 1975 |

OBJECTS AND SUMMARY OF THE INVENTION

Accordingly, it is the object of this invention to provide movable power-operated instrument console and treatment chair apparatus which overcomes problems presented by prior apparatus and is characterized by being selectively individually or simultaneously movable to desired positions for patient treatment.

By this invention, it has been found that the above object may be accomplished by providing such apparatus, generally as follows.

A treatment chair includes an occupant supporting assembly, a base assembly, and an elevator assembly connected to and between the occupant supporting assembly and the base assembly for raising and lowering the occupant supporting assembly. A drive means is connected with the treatment chair elevator assembly for operating same.

An instrument console includes a tray assembly for carrying instruments and the like, a base assembly, and an elevator assembly connected to and between the tray assembly and the base assembly for the raising and lowering the tray assembly. Drive means are connected with the instrument console elevator assembly for operating same.

Control means are connected with the chair drive means and the console drive means for selectively (1) simultaneously operating both of the drive means for simultaneous raising or lowering of the treatment chair occupant supporting assembly and the instrument console tray assembly, or (2) independently operating each of the drive means for independent raising or lowering of the treatment chair occupant supporting assembly and the instrument console assembly.

Preferably, the tray assembly of the instrument console includes at least two pivotally mounted arms in which one of the arms has one end thereof pivotally connected to the tray assembly and the other end thereof pivotally connected to one end of the other of the arms, and the other of the arms has the other end thereof pivotally connected to the elevator assembly for providing easy independent movement of the tray assembly to desired over-the-patient positions. Also, the treatment chair supporting base assembly preferably comprises a first stationary portion for supporting the treatment chair on a floor or other surface, and a swiveling portion carrying the occupant supporting assembly and mounted for swiveling movement on the stationary portion for allowing desired swiveling positioning of the occupant supporting assembly. The instrument console base assembly preferably is mounted on and carried by the swiveling portion of the treatment chair for swiveling movement of the instrument console with the treatment chair while providing a firm support for the instrument console.

In accordance with a preferred form of the apparatus according to this invention, an auxiliary instrument console, in addition to the primary instrument console described above, is provided. Such auxiliary instrument console is unattached to the treatment chair and the primary instrument console for the desired positioning adjacent thereto and includes a tray assembly for carrying instruments and the like, a base assembly, and an elevator assembly connected to and between the tray assembly and the base assembly for raising and lowering of the tray assembly. Drive means are connected with the auxiliary instrument console elevator assembly for operating same.

In this preferred form of apparatus according to this invention, the control means are connected with the chair drive means, the primary console drive means, and the auxiliary console drive means for (1) simultaneously operating all three of the drive means for simultaneous raising or lowering of the treatment chair occupant supporting assembly and both of the primary and auxiliary instrument console tray assemblies, or (2) independently operating each of the three drive means for independent selective raising or lowering of the treatment chair occupant supporting assembly, the primary instrument console tray assembly and the auxiliary instrument console tray assembly.

In accordance with this invention, it is preferred that the above-described drive means comprise, separate, electrically operable, reversible motors for being selectively operated in either forward or reverse directions for effecting raising and lowering operations of the respective elevator assemblies of the treatment chair and the primary and auxiliary instrument consoles. The control means preferably comprises a source of electrical energy, an electric circuit connected between the source of electric energy and each of the reversible motors, and suitable manually operated switches in the circuit for simultaneously completing the electric circuit to each of the reversible motors for simultaneous operation thereof in the desired direction for effecting simultaneous raising or lowering operations in the treatment chair, the primary instrument console and the auxiliary instrument console, and for independently completing the electric circuit to a selected one of the reversible motors for independent operation thereof in the desired direction for effecting independent raising or lowering operations in the treatment chair, the primary instrument console and the auxiliary instrument console.

BRIEF DESCRIPTION OF THE DRAWINGS

Some of the objects and advantages of the invention having been stated, other objects and advantages will appear when taken in conjunction with the accompanying drawings in which.

DESCRIPTION OF PREFERRED EMBODIMENT

Figure 1:
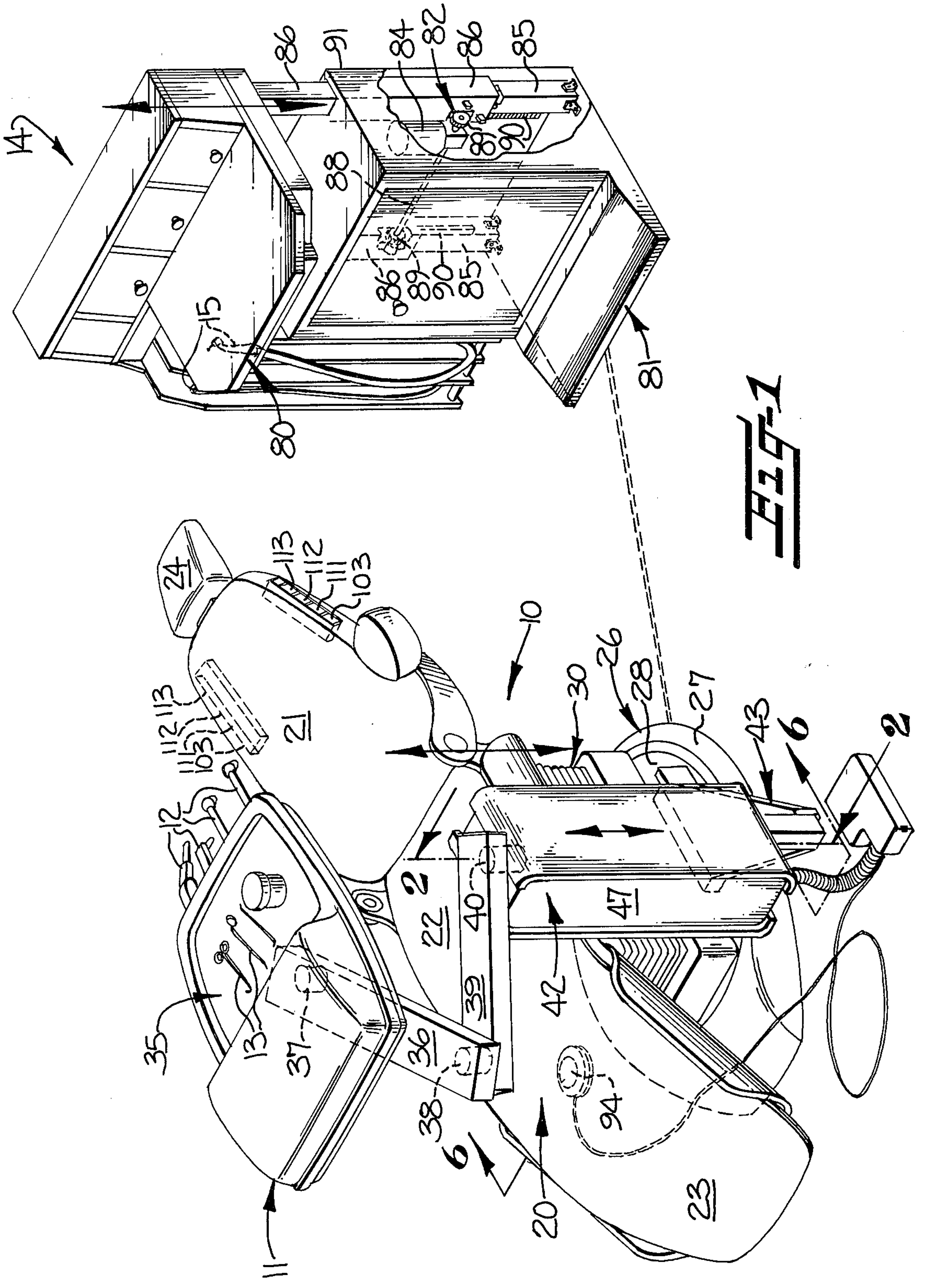
FIG. 1 is a perspective view of the movable power-operated instrument console and treatment chair apparatus in accordance with this invention.
Figure 2:
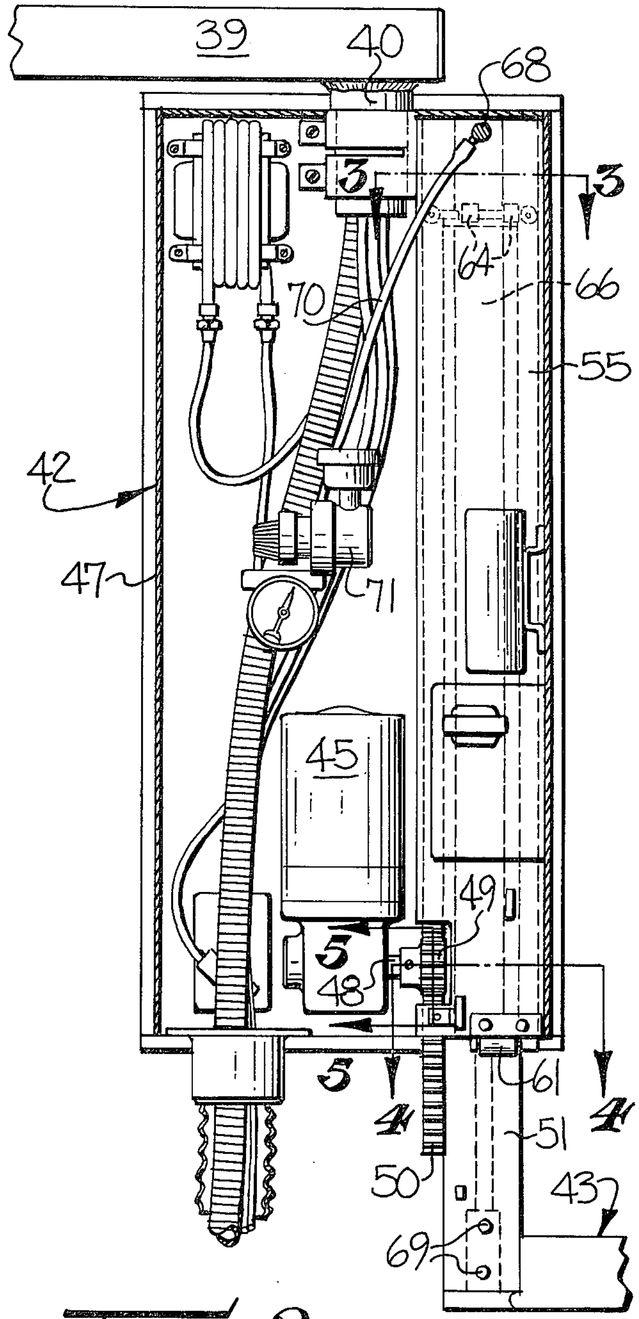
FIG. 2 is a sectional view, taken generally along the line 2—2 of FIG. 1.
Figure 3:
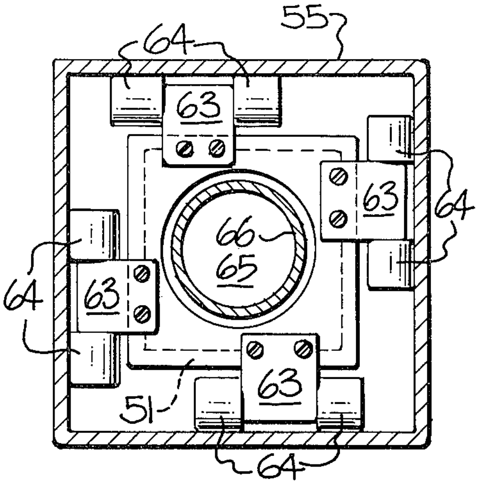
FIG. 3 is a sectional view, taken generally along the line 3—3 of FIG. 2.
Figure 4:
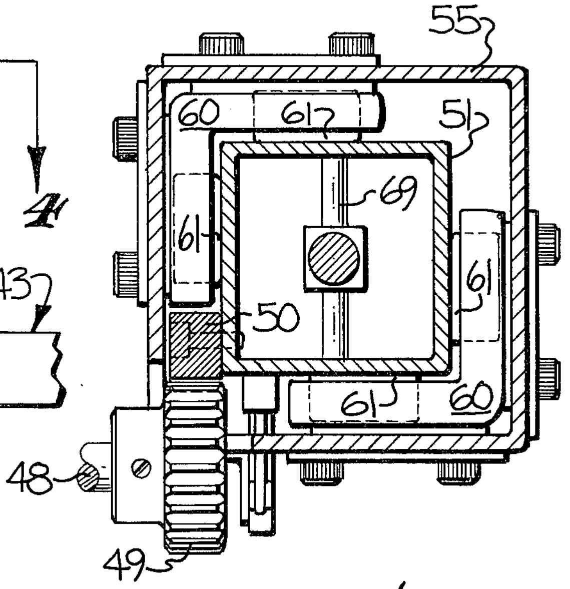
FIG. 4 is a sectional view, taken generally along the line 4—4 of FIG. 2.

Referring now to the drawings, there is shown in FIG. 1 a preferred arrangement of movable, power-operated, instrument console and treatment chair apparatus in accordance with this invention. The apparatus includes broadly a treatment chair 10 for receiving and supporting a patient in a desired position, and a primary instrument console 11 for carrying power-operated instruments 12 such as dental handpiece instruments or the like along with other miscellaneous tools or instruments 13 for ready access to the dentist, dental assistant or other person performing treatment upon a patient. The apparatus, as shown in FIG. 1, may also include an auxiliary instrument console 14 which is detached from the treatment chair 10 and the primary instrument console 11 and is adapted to carry power-operated instruments 15 and various other tools and accessories in the cabinetry and tray surfaces thereof for easy access thereto by the dentist, dental assistant or other person performing treatment upon the patient positioned in the treatment chair 10.

Figure 6:
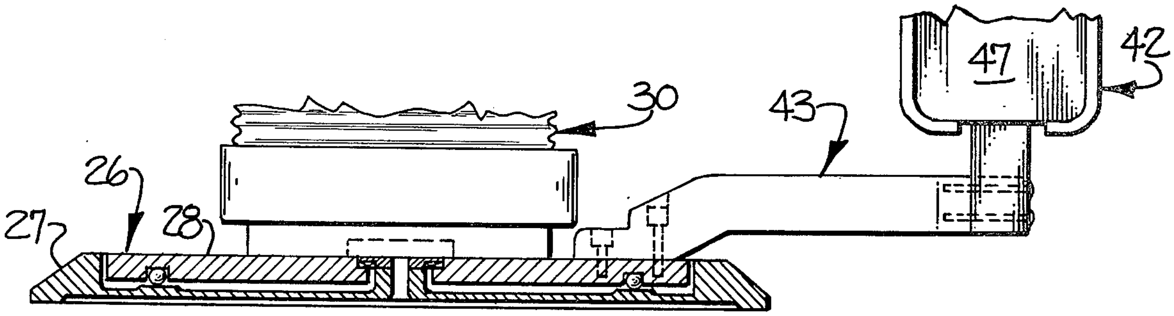
FIG. 6 is a sectional view, taken generally along the line 6—6 of FIG. 1.

Referring firstly to the treatment chair 10, this chair may be constructed in accordance with the aforementioned U.S. Pat. No. 3,804,460, assigned to the assignee of the present invention, in which the chair is power-operated for up-and-down movement, forward-and-reverse movement, and movement between an upright and a reclined position. Generally, the chair comprises an occupant-supporting assembly 20 which may include a back rest 21, a seat portion 22, leg rest 23 and head rest 24. The treatment chair 10 further includes a base assembly 26 including a first stationary portion 27 (see FIGS. 1 and 6) for supporting the treatment chair on a floor or surface and a swiveling portion 28 suitably mounted within the stationary portion 27 on ball bearings or the like for providing swiveling positioning of the treatment chair.

The treatment chair further includes an elevator assembly 30 connected to and between the occupant-supporting assembly 20 and the base assembly 26 for raising and lowering the occupant-supporting assembly 20. An electrically operable drive means, preferably in the form of a reversible electric motor 32 (shown schematically in FIG. 7) is connected with the elevator assembly 30 for operating the same to raise and lower the treatment chair 10. The specific construction and operation of the elevator assembly 30 for raising and lowering of the treatment chair 10 is fully described in the aforementioned U.S. Pat. No. 3,804,460 and will not be further described herein as it is not deemed necessary for an understanding of the present invention, such elevator assembly 30 being only shown schematically in FIGS. 1 and 7 hereof.

The primary instrument console 11 includes a tray assembly 35 adapted to carry the power-operated dental handpieces 12 or the like and includes an upper tray shaped configuration upon which miscellaneous instruments and tools 13 may be placed. The interior of the tray assembly is adapted to contain hose for the power-operated dental handpieces and other devices for their operation which are well-known to those with ordinary skill in the art. The tray assembly is pivotally mounted at 37 on one end of an arm 36 which is in turn pivotally mounted at 38 on its other end to one end of a second arm 39 which has its other end pivotally mounted at 40 to the upper end of an elevator assembly 42 for raising and lowering of the tray assembly 35 so as to position the tray assembly 35 at desired positions over a patient seated in the treatment chair 10. The elevator assembly 42 is mounted on a base assembly 43 which is in turn mounted on and carried by the swiveling portion 28 of the base assembly 26 of the treatment chair 10 (as shown particularly in FIG. 6) so that the primary instrument console 11 will swivel with the treatment chair 10 to maintain the same in desired positions with respect to a patient seated in the treatment chair 10.

A drive means, preferably in the form of an electrically operated reversible motor 45, is connected with the instrument console elevator assembly 42 for operating same.

Referring more specifically to FIGS. 2–5 which illustrate in detail the instrument console elevator assembly 42, it may be seen that this elevator assembly 42 comprises a hollow housing 47 to which the reversible motor 45 is stationarily secured therewithin. The motor 45 includes a shaft 48 extending outwardly therefrom to be driven in either direction of rotation. A pinion gear 49 is secured to the outer end of the shaft 48 and engages a rack gear 50 secured to the outside of a hollow stationary post 51 which is carried by the base assembly 43. The stationary post 51 extends up into the hollow interior of housing 47 and telescopes inside of a hollow movable post 55 secured to the inside of housing 47.

The stationary post 51 and movable post 55 are adapted for relative movement with respect to each other by the movable post 55 moving up and down in telescoping relationship along the stationary post 51. The movable post 55 carries the housing 47 of the elevator assembly 30 therewith and thus the arms 36, 39 and tray assembly 35. To aid in this up and down movement of the movable post 55 with respect to the stationary post 51, brackets 60 are secured to the inside of the movable post 55 and carry rollers 61 which engage the outside surface of stationary post 51. Also, the stationary post 51 has secured to the outside surface thereof brackets 63 which carry rollers 64 which engage the inside surface of movable post 55. The above described brackets 60, 63 and rollers 61, 64 carried thereby guide the movable post 55 in its up and down movement in telescoping relationship along the outside of stationary post 51.

As an assist and dampening means with respect to the up and down movement of movable post 55, housing 47 and tray assembly 35, an air operated piston 65 and cylinder 66 are provided. The cylinder 66 is secured to the inside of movable post 55 by a hollow pin connection 68 (see FIG. 2) for movement therewith. The piston 65 and rod extending therefrom are secured internally to the bottom of stationary post 51 by a suitable connection 69 (see FIG. 2). An air line 70 leads from a suitable air supply (indicated schematically in FIG. 7) through a relief valve 71 to hollow pin connection 68 to provide a supply of compressed air internally of the cylinder 66 and provide a predetermined pressure against the piston end of piston 65 to bias the movable post 55 and the housing 47 of the elevator assembly 30 along with the tray assembly 35 in an upward direction and provide a damper against downward movement of the movable post 55 with respect to the stationary post 51. During such downward movement, air is forced back through the air line 70 and through the relief valve 71.

Thus, as the electrically operated reversible motor 45 rotates the shaft 41 and pinion gear 49 in one direction, the rack 50 will be moved upwardly carrying the movable post 55 and the housing 47 of the elevator assembly 42 to elevate the tray assembly 35. This upward movement is assisted by the air operated piston and cylinder 65, 66. Likewise, when the electrically operated reversible motor 45 rotates the shaft 48 and the pinion gear 49 in the opposite direction, the rack gear 50 will be lowered which in turn lowers the movable post 55 and housing 47 of the elevator assembly 42 to lower the tray assembly 35. This lowering action will be dampered by the piston and cylinder mechanism 65, 66.

Figure 5:
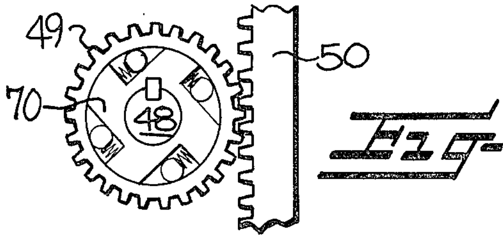
FIG. 5 is a sectional view, taken generally along the line 5—5 of FIG. 2.

As a further safety feature, a one way clutch 70 (see FIG. 5) is provided between the motor driven shaft 48 and the pinion gear 49 which provides for release of the driving connection between motor driven shaft 48 and pinion gear 49 in the clockwise direction of rotation shown in FIG. 5 and in the lowering direction of the rack gear 49 and mechanisms carried thereby, if resistance to such lowering of the elevator assembly 42 is encountered such as might be present if the tray assembly 35 contacts the patient in the treatment chair during such lowering operation. The one way clutch 70, as illustrated in FIG. 5, may be in the form of a conventional ball clutch in which the balls thereof are biased by springs into clutching or driving engagement and may be pushed against such bias into non-clutching or non-driving engagement when resistance is encountered. Thus, injury to a patient in the treatment chair, resulting from inadvertent lowering of the tray assembly beyond a position in which it engages a patient seated in the treatment chair 10, is prevented.

In accordance with a preferred form of apparatus in accordance with this invention, the auxiliary instrument console 14 may be provided which is unattached to the primary instrument console 11 and the treatment chair 10 for desired positioning adjacent thereto, as shown in FIG. 1. This auxiliary instrument console 14 may include a tray assembly 80 for carrying instruments 81, such as the power-operated dental handpieces 15 along with miscellaneous tools and instruments on its upper surface. The auxiliary instrument console 14 further includes a base assembly 81 for supporting the console 14 on the floor or other surface and an elevator assembly 82 connected to and between the tray assembly 80 and the base assembly 81 for raising and lowering the tray assembly.

An electrically operable drive means, preferably in the form of a reversible electric motor 84, is connected with the auxiliary instrument console elevator assembly 82 for operating same.

The auxiliary instrument console elevator assembly 82 may be constructed generally in accordance with the primary instrument console elevator assembly 42 in that it utilizes a pair of stationary posts 85 secured at the bottom ends thereof to the base 81 and a pair of movable posts 86 telescopingly positioned around the outside of stationary posts 85 for up and down movement with respect thereto. The reversible motor 84 selectively rotates a driven shaft 88 which carries pinion gears 89 on the outside ends thereof which engage rack gears 90 secured to the movable posts 86. A housing 91 is disposed around the elevator assembly and in the case of the auxiliary instrument console 14 is stationary, rather than movable as is the case with the primary instrument console 42. The movable posts 86 extend through and out of the top of the housing 91 and are connected to the tray assembly 80 for upward and downward movement thereof. The elevator assembly 82 of the auxiliary instrument console 14 may also include the other mechanisms described above and incorporated in the elevator assembly 42 of the primary instrument console 11.

Both of the housings 47 and 91 of the respective elevator assemblies 42, 82 of the primary and auxiliary instruments consoles 11, 14 are adapted to contain air hoses and other support equipment for operating the power-operated instruments 12, 15 carried by each of these consoles, so as to provide compact, self-contained instrument consoles. These power-operated instruments may be operated from a foot controller mechanism 94 in a manner well understood by those with ordinary skill in the art.

Figure 7:
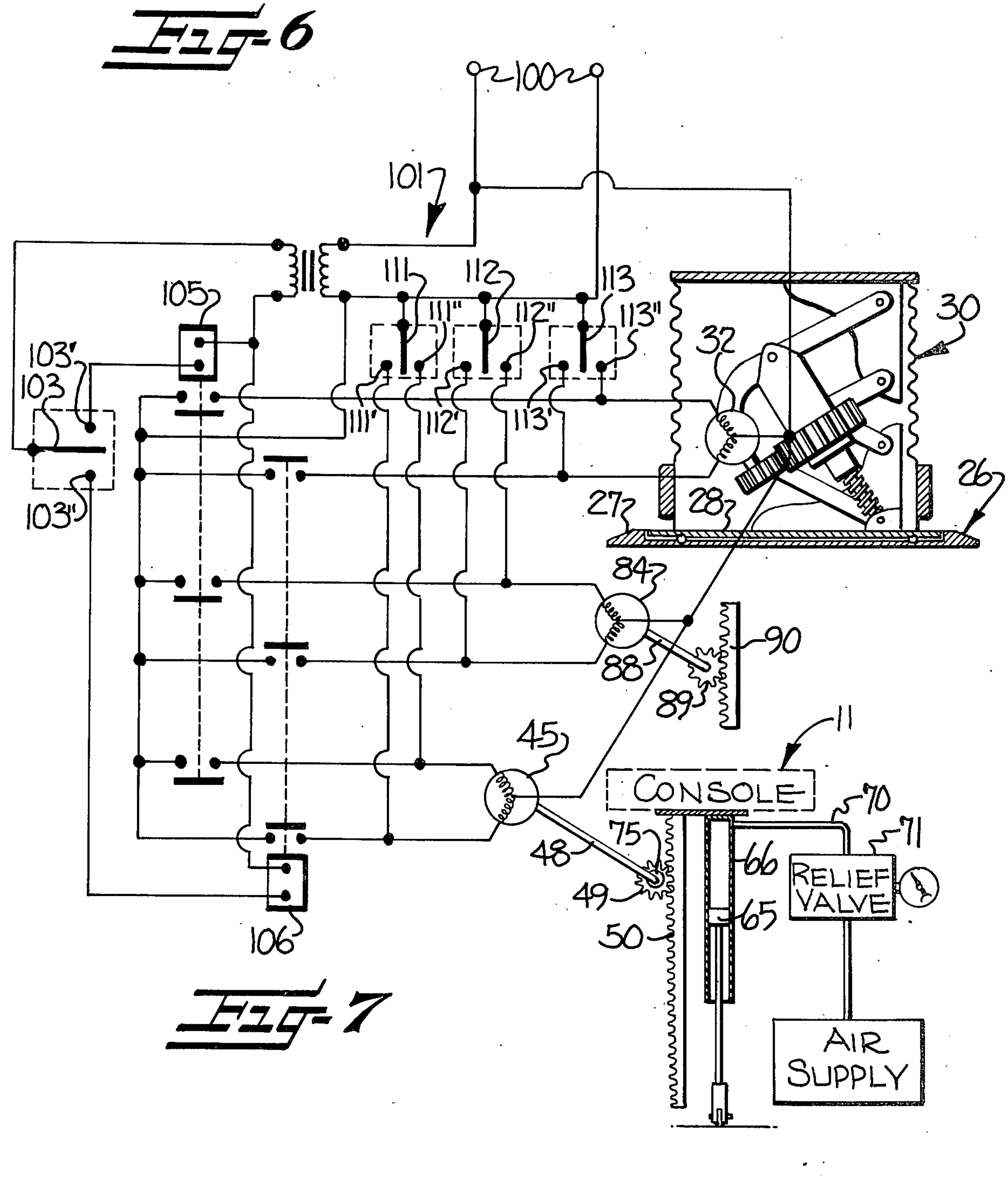
FIG. 7 is a schematic electrical, mechanical view illustrating the drive means and control means utilized in the apparatus of this invention.

The apparatus of this invention further includes control means, shown schematically in FIG. 7, connected with the treatment chair drive means 32, the primary instrument console drive means 84, and, if utilized, with the auxiliary instrument console drive means 45, for selectively (1) simultaneously operating the drive means 32, 45, 84 for simultaneous raising or lowering of the treatment chair occupant-supporting assembly 20 and the instrument console tray assemblies 35, 80, or (2) independently operating each of the drive means 32, 45, 84 for independently raising or lowering of the treatment chair occupant-supporting assembly 20 and the instrument console tray assemblies 35, 80.

As shown in FIG. 7, this control means comprises a source of electrical energy, indicated schematically at 100, and an electric circuit, indicated schematically and collectively at 101, connected between the source of electrical energy 100 and each of the reversible motors 32, 45, 84. A first, manually operable, normally open, double throw switch 103 is connected in the circuit 101 and includes two contact sets 103', 103" for being manually operated to selectively close one or the other of the contact sets 103', 103" for simultaneously completing the electric circuit 101 to each of the three reversible motors 32, 45, 84 for simultaneous operation thereof in the desired direction for effecting simultaneous raising or lowering operations in the treatment chair 10, primary instrument console 11 and auxiliary instrument console 14.

For example, if the switch 103 is manually moved to close the contact set 103', a solenoid operated switch 105 will be energized to close the three switches thereof to complete the electric circuit 101 to one side of the reversible motors 32, 45, 84 for causing operation thereof in one direction for rotating the respective shafts and gears for a raising or lowering operation. On the other hand, if the switch 103 is moved to close the contact set 103", a solenoid operated switch 106 will be energized to close its three switches for completing the electric circuit 101 to the other side of the reversible motors 32, 45, 84 for causing operation thereof in the opposite direction for rotating the respective drive shafts and gears thereof in the opposite direction for the other of the raising or lowering operation.

The control means further includes second, third and fourth, manually operable, normally open, double throw switches 111, 112, 113 which are connected in the circuit 101 and each have two contact sets 111', 111" and 112', 112" and 113', 113" for being selectively individually manually closed to selectively close one or the other of the contact sets of either of the second, third or fourth switches 111, 112, 113 for independently completing the electric circuit 101 to a selected one of the reversible motors 32, 45, 84 for independent operation thereof in the desired direction for effecting independent raising or lowering operations in the treatment chair 10, primary instrument console 11 and auxiliary instrument console 14.

For example, if the switch 113 is closed to contact the contact set 113', the electric circuit will be completed to one side of the reversible motor 32 only for driving of the treatment chair elevator assembly 30 in one direction of its upward or downward movement. Likewise, if the switch 113 is closed to contact the other contact set 113", the electric circuit 101 will be closed to the other side of the reversible motor 32 to drive the reversible motor and the treatment chair elevator assembly 30 in the other direction for raising or lowering thereof. This described operation is the same with respect to the switches 111, 112 and their respective contact sets 111', 111" and 112', 112".

The above-described switches 103, 111, 112, 113 may be conveniently located on the side of the backrest portion 21 of the occupant-supporting assembly 20 of the treatment chair 10 for easy access thereto by he dentist or dental assistant or other persons utilizing the apparatus of this invention for simultaneous raising or lowering of the treatment chair 10, primary instrument console 11 and auxiliary instrument console 14 or for independent raising or lowering of the treatment chair 10, primary instrument console 11 or auxiliary instrument console 14.

As is evident, if the auxiliary instrument console 14, described above, is not desired with the movable, power-operated, instrument console and treatment chair apparatus of this invention, it may be simply eliminated along with its control switch 112 and associated electrical circuit control means, and simultaneous or independent raising or lowering of the treatment chair 10 and primary instrument console 11 may be effected by the apparatus described above.

In the drawings and specification, there has been set forth a preferred embodiment of the invention and, although specific terms are employed, they are used in a generic and descriptive sense only.

What is claimed is:

1. Movable, power-operated, instrument console and treatment chair apparatus characterized by being selectively individually or simultaneously movable to desired positions for patient treatment; said apparatus comprising:

a treatment chair having an occupant supporting assembly, a base assembly, and an elevator assembly connected to and between said occupant supporting assembly and said base assembly for raising and lowering said occupant supporting assembly;

drive means connected with said treatment chair elevator assembly for operating same;

an instrument console having a tray assembly for carrying instruments and the like, a base assembly, and an elevator assembly connected to and between said tray assembly and said base assembly for raising and lowering said tray assembly;

drive means connected with said instrument console elevator assembly for operating same; and control means connected with said chair drive means and said console drive means for selectively (1) simultaneously operating both of said drive means for simultaneous raising or lowering of said treatment chair occupant supporting assembly and said instrument console tray assembly, or (2) independently operating each of said drive means for independent raising or lowering of said treatment chair occupant supporting assembly and said instrument console tray assembly.

2. Apparatus, as set forth in claim 1, in which each of said drive means comprises electrically operable drive means, and said control means include an electric circuit connected with both of said drive means, and manually operated switch means connected in said electric circuit for selectively completing said electric circuit to both of said electrically operable drive means.

3. Apparatus as set forth in claim 1, in which each of said drive means comprises a separate, electrically operable, reversible motor for being selectively operated in either forward or reverse directions for effecting raising and lowering operations of said respective elevator assemblies of said treatment chair and said instrument console, and said control means comprises a source of electrical energy, an electric circuit connected between said source of electrical energy and each of said reversible motors, a first, manually operable, normally open, double throw switch connected in said circuit and having two contact sets for being manually operated to selectively close one or the other of said contact sets for simultaneously completing said electric circuit to each of said reversible motors for simultaneous operation thereof in the desired direction for effecting simultaneous raising or lowering operations in said treatment chair and said instrument console, and second and third, manually operable, normally open, double throw switches connected in said circuit and each having two contact sets for being selectively individually manually closed to selectively close one or the other of said contact sets of either of said second or third switches for independently completing said electric circuit to a selected one of said reversible motors for independent operation thereof in the desired direction for effecting independent raising or lowering operations in said treatment chair and said instrument console.

4. Apparatus, as set forth in claim 1, in which said treatment chair supporting base assembly comprises a first stationary portion for supporting said treatment chair a on floor or other surface, and a swiveling portion carrying said occupant supporting assembly and mounted for swiveling movement on said stationary portion for allowing desired swiveling positioning of said occupant supporting assembly, and said instrument console base assembly being mounted on and carried by said swiveling portion of said treatment chair for swiveling movement of said instrument console with said treatment chair while providing a firm support for said instrument console.

5. Apparatus, as set forth in claim 1, in which said tray assembly of said instrument console includes at least two pivotally mounted arms, in which one of said arms has one end thereof pivotally connected to said tray assembly and the other end thereof pivotally connected to one end of the other of said arms, and the other of said arms has the other end thereof pivotally connected to said elevator assembly for providing easy independent movement of said tray assembly to desired over-the-patient positions.

6. Apparatus, as set forth in claim 1, in which said instrument console further includes a hollow housing portion surrounding said elevator assembly and having an interior area thereof for containing support apparatus for the instruments carried by said tray assembly to provide a compact, self-contained, instrument console.

7. Movable power-operated, instrument console and treatment chair apparatus characterized by being selectively individually or simultaneously movable to desired positions for patient treatment; said apparatus comprising:

a treatment chair having an occupant-supporting assembly, a base assembly including a first stationary portion for supporting said treatment chair on a floor or surface and a swiveling portion carrying said occupant-supporting assembly and mounted for movement on said stationary portion for allowing the desired swiveling positioning of said occupant-supporting assembly, and an elevator assembly connected to and between said occupant supporting assembly and said base assembly for raising and lowering said occupant supporting assembly;

electrically operable drive means connected with said treatment chair elevator assembly for operating same;

an instrument console having a tray assembly for carrying instruments and the like, a base assembly mounted on and carried by said swiveling portion of said treatment chair base assembly for swiveling movement of said instrument console with said treatment chair, an elevator assembly connected to and between said tray assembly and said base assembly for raising and lowering of said tray assembly, and at least two pivotally mounted arms in which one of said arms has one end thereof connected to said tray assembly and the other end thereof connected to one end of the other of said arms and the other of said arms having the other end thereof connected to said elevator assembly for providing easy independent movement of said tray assembly to desired over-the-patient positions;

electrically operable drive means connected with said instrument console elevator assemby for operating same; and control means comprising an electric circuit connected with said chair drive means and said console drive means and manually operated switch means connected in said electric circuit for selectively completing an electric circuit to said electrically operable drive means for selectively (1) simultaneously operating both of said drive means for simultaneous raising or lowering of said treatment chair occupant-supporting assembly and said instrument console tray assembly, or (2) independently operating each of said drive means for independent raising or lowering of said treatment chair occupant supporting assembly and said instrument console tray assembly.

8. Movable, power-operated, instrument console and treatment chair apparatus characterized by being selectively individually or simultaneously movable to desired positions for patient treatment; said apparatus comprising:

a treatement chair having an occupant supporting assembly, a base assembly, and an elevator assembly connected to and between said occupant supporting assembly and said base assembly for raising and lowering said occupant supporting assembly;

drive means connected with said treatment chair elevator assembly for operating same;

a primary instrument console having a tray assembly for carrying instruments and the like, a base assembly mounted on and carried by said treatment chair base assembly, and an elevator assembly connected to and between said tray assembly and said console supporting base assembly for raising and lowering of said tray assembly;

drive means connected with said primary instrument console elevator assembly for operating same;

an auxiliary instrument console being unattached to said treatment chair and said primary instrument console for desired positioning adjacent thereto and including a tray assembly for carrying instruments and the like, a base assembly, and an elevator assembly connected to and between said tray assembly and said base assembly for raising and lowering said tray assembly; p1 drive means connected with said auxiliary instrument console elevator assembly for operating same; and control means connected with said chair drive means, said primary console drive means and said auxiliary console drive means for (1) simultaneously operating all three of said drive means for simultaneous raising or lowering of said treatment chair occupant supporting assembly and both said primary and auxiliary instrument console tray assemblies, or (2) independently operating each of said three drive means for independent selective raising or lowering of said treatment chair occupant supporting assembly, said primary instrument console tray assembly and said auxiliary instrument console tray assembly.

9. Apparatus, as set forth in claim 8, in which each of said three drive means comprise a separate, electrically operable, reversible motor for being selectively operated in either forward or reverse directions for effecting raising and lowering operations of said respective elevator assemblies of said treatment chair and said primary and auxiliary instrument consoles, and said control means comprises a source of electrical energy, an electric circuit connected between said source of electrical energy and each of said reversible motors, a first, manually operable, normally open, double throw switch connected in said circuit and having two contact sets for being manually operated to selectively close one or the other of said contact sets for simultaneously completing said electric circuit to each of said three reversible motors for simultaneous operation thereof in the desired direction for effecting simultaneous raising or lowering operations in said treatment chair, said primary instrument console and said auxiliary instrument console, and second, third and fourth, manually operable, normally open, double throw switches connected in said circuit and each having two contact sets for being selectively individually manually closed to selectively close one or the other of said contact sets of either of said second, third or fourth switches for independently completing said electric circuit to a selected one of said reversible motors for independent operation thereof in the desired direction for effecting independent raising or lowering operations in said treatment chair, said primary instrument console and said auxiliary instrument console.

10. Apparatus as set forth in claim 8, in which:

said treatment chair supporting base assembly comprises a first stationary portion for supporting said treatment chair on a floor or other surface, and a swiveling portion carrying said occupant supporting assembly and mounted for swiveling movement with said stationary portion for allowing desired swiveling positioning of said occupant supporting assembly of said treatment chair, and said primary instrument console base assembly being mounted on and carried by said swiveling portion of said treatment chair for swiveling movement of said primary instrument console with said treatment chair while providing a firm support for said primary instrument console.

11. Apparatus, as set forth in claim 8 in which said tray assembly of said primary instrument console includes at least two pivotally mounted arms, in which one of said arms has one end thereof connected to said tray assembly and the other end thereof connected to one end of the other of said arms, and the other of said arms has the other end thereof pivotally connected to said elevator assembly for providing easy independent motion of said tray assembly to desired over-the-patient positions.

12. Apparatus, as set forth in claim 8, in which each of said primary and auxiliary instrument consoles further include a hollow housing portion surrounding the respective elevator assemblies and having an interior area thereof for containing support apparatus for the instruments carried by said respective tray assemblies and other desired equipment to provide compact, self-contained, instrument consoles.

13. Movable, power-operated, instrument console and treatment chair apparatus characterized by being selectively individually or simultaneously movable to desired positions for patient treatment; said apparatus comprising:

a treatment chair having an occupant supporting assembly, a base assembly including a first stationary portion for supporting said treatment chair on a floor or other surface and a swiveling portion carrying said occupant supporting assembly and mounted for movement on said stationary portion for allowing desired swiveling positioning of said occupant supporting assembly, and an elevator assembly connected to and between said occupant supporting assembly and said base assembly for raising and lowering said occupant supporting assembly;

electrically operable drive means connected with said treatment chair elevator assembly for operating same;

a primary instrument console having a tray assembly for carrying instruments and the like, a base assembly mounted on and carried by said swiveling portion of said treatment chair base assembly for swiveling movement of said instrument console with said treatment chair, an elevator assembly connected to and between said tray assembly and said console base assembly for raising and lowering of said tray assembly, and at least two pivotally mounted arms in which one of said arms has one end thereof connected to said tray assembly and the other end thereof connected to one end of the other of said arms and the other of said arms having the other end thereof pivotally connected to said elevator assembly for providing easy independent movement of said tray assembly to desired over-the-patient positions;

electrically operable drive means connected with said primary instrument console elevator assembly for operating same;

an auxiliary console being unattached to said treatment chair and said primary instrument console for desired positioning adjacent thereto and including a tray assembly for carrying instruments and the like, a base assembly, and an elevator assembly connected to and between said tray assembly and said base assembly for raising and lowering said tray assembly, electrically operable drive means connected with said auxiliary instrument console elevator assembly for operating same; and control means comprising an electric circuit connected with said chair drive means, said primary instrument console drive means and said auxiliary instrument console drive means, and manually operated switch means connected in said electric to said electrically operable drive means for selectively (1) simultaneously operating all three of said drive means for simultaneous raising or lowering of said treatment chair occupant supporting assembly and both said primary and auxiliary instrument console tray assemblies, or (2) independently operating each of said three drive means for independent selective raising or lowering of said treatment chair occupant supporting assembly, said primary instrument console tray assembly and said auxiliary instrument console tray assembly.

* * * * *

UNITED STATES PATENT AND TRADEMARK OFFICE
CERTIFICATE OF CORRECTION

PATENT NO. : 4,114,274

DATED : September 19, 1978

INVENTOR(S) : Arthur Lee Jones

It is certified that error appears in the above-identified patent and that said Letters Patent are hereby corrected as shown below:

Column 9, Line 17, change "a on" to --on a--; Column 10, Line 57, delete "pl"; begin new subparagraph in Column 10, Line 58 with --drive means--.

Signed and Sealed this

*Nineteenth* Day of *December 1978*

[SEAL]

*Attest:*

RUTH C. MASON
*Attesting Officer*

DONALD W. BANNER
*Commissioner of Patents and Trademarks*